United States Patent [19]
Hossack et al.

[11] Patent Number: 5,860,573
[45] Date of Patent: Jan. 19, 1999

[54] DASHBOARD ACCESSORY SUPPORT

[76] Inventors: Lance Hossack, 2877 Nixon Gulch, Manhanttan, Mont. 59741; Leland Thill, 2625 Arrow Leaf Hills, Bozeman, Mont. 59715

[21] Appl. No.: 885,204

[22] Filed: Jun. 30, 1997

[51] Int. Cl.⁶ .................................................. B60R 11/00
[52] U.S. Cl. .................. 224/483; 224/539; 224/556; 224/913; 224/922; 248/309.1; 248/201; 211/64; 211/70.8; 211/89.01; 296/37.12
[58] Field of Search ................... 224/400, 482, 224/483, 277, 545, 546, 548, 550, 555, 556, 560, 561, 563, 567, 568, 571, 913, 922, 539, 540, 542, 901, 901.2, 324; 248/309.1, 316.2, 634, 201; 211/64, 70.8, 89.01, 60.1; 296/37.12

[56] References Cited

U.S. PATENT DOCUMENTS

| | | | |
|---|---|---|---|
| 2,302,300 | 11/1942 | Davies | 224/546 |
| 2,497,365 | 2/1950 | McMurtry | 224/483 |
| 2,797,851 | 7/1957 | Leake | 224/546 |
| 3,746,177 | 7/1973 | Vilotti | 211/64 |
| 4,120,436 | 10/1978 | Burch | 224/913 |
| 4,132,381 | 1/1979 | McClellan | 211/89.01 |
| 4,402,442 | 9/1983 | Martino | 224/324 |
| 4,878,641 | 11/1989 | Vogt | 248/309.1 |
| 5,509,633 | 4/1996 | Ruster et al. | 224/926 |
| 5,660,311 | 8/1997 | Soltau | 224/483 |

FOREIGN PATENT DOCUMENTS

2669872 A1  6/1992  France ................................ 224/539

*Primary Examiner*—Allan N. Shoap
*Assistant Examiner*—Gregory M. Vidovich
*Attorney, Agent, or Firm*—D. L. Tschida

[57] ABSTRACT

A support system including one or more resilient cradles which mount to the dashboard of a vehicle to support sundry paraphernalia, e.g. guns, fishing rods, sunglasses, coffee cups. A preferred foam cradle includes surfaces shaped to fit a vehicle profile defined between the dashboard and window. Projections and reliefs mate with complementary structure at the vehicle. The cradles can include notches, holes, flanges, hooks, and straps to facilitate item support and storage. A composite cradle constructed of a plastic core and foam covers is also disclosed.

20 Claims, 8 Drawing Sheets

DASHBOARD ACCESSORY SUPPORT

BACKGROUND OF THE INVENTION

The present invention relates to automotive accessory supports and, in particular, to a dashboard support for firearms, fishing rods and sundry other paraphernalia found in automobiles.

A variety of support systems have been developed for securing firearms and fishing rods within the interior spaces of trucks and automobiles. Most are constructed of metal and plastic framed assemblies which mount to the ceiling, cab wall, floor, seat front or back, or a rollbar or other stationary portion of the vehicle. The assemblies typically provide a rigid framework having a number of cradles which are adapted to support a firearm or fishing rod. Some are configured as a shelf support. Some assemblies horizontally support a firearm along the floor. Some assemblies provide a vertical support which extends from the floor and which may obtain additional support through attachments to the vehicle dashboard. Various of these assemblies are shown at U.S. Pat. Nos. 2,929,539; 3,473,673; 3,802,612; 4,120,436; 4,363,499; 4,560,134; 4,579,263; 4,682,720; 4,796,762; 4,852,780; 4,991,723; 5,078,279; 5,129,563; 5,350,094; 5,438,787; and 5,443,191.

Fabric support assemblies also exist which mount to a seat back or front. Some fabric supports alternatively mount to the vehicle, such as the rear wall of a pickup truck cab, or are suspended from the ceiling or clothes hanger hooks provided along the side walls of the vehicle. Pockets or loops are typically provided to receive and contain one or more firearms, fishing rods and miscellaneous accessories and paraphernalia.

The dashboard of a vehicle is also frequently used as a shelf to support sundry items. However, when traversing bumpy terrain or during stopping, the items are free to move about and can be thrown from the dash. The driver may be distracted or injured in such circumstances. Many states also have motor vehicle regulations regarding the use of a dashboard as a support and the obstruction of the viewing area. Preferably any items stored on the dashboard should be positively supported against jostling and should not obstruct normal vision.

In appreciation of the lack of any known support system for safely containing firearms or other elongated items to a dashboard, the present resilient support system was developed. The system provides a number of resilient cradles which are shaped to conform to the profile presented between a dashboard and windshield to positively restrain each cradle, once positioned. The cradles can be constructed of a rigid foam, which exhibits some resilience, or other elastomer materials or as composite assemblies. Each cradle includes appropriate notches or cavities to safely contain items mounted thereto. Multiple cradles can be positioned along the dashboard with appropriate notches to support elongated items. Hangers, holes and reliefs can be supported or formed into the cradles as desired.

SUMMARY OF THE INVENTION

It is accordingly a primary object of the invention to provide a dashboard support system for automotive vehicles for containing and securing items against jostling with normal vehicle movement, e.g. firearms, fishing rods or sundry other items supported thereto.

It is a further object of the invention to provide resilient support cradles having surfaces which actively secure the cradles between the dashboard and windshield.

It is a further object of the invention to provide support cradles having resilient surfaces which compress during installation and expand to conform to the profile defined between a dashboard and windshield.

It is a further object of the invention to provide open cell foam cradles which include one or more notches shaped to receive a particular item, such as a firearm or fishing rod.

It is a further object of the invention to provide cradles having projecting surfaces or reliefs which interlock with recesses and projections typically found at a vehicle dashboard, e.g. vents, shelves, cup holders etc.

It is a further object of the invention to provide support cradles having fasteners for positively securing a cradle to the dashboard and/or securing stored items to a cradle.

Various of the foregoing objects, advantages and distinctions of the invention are obtained in a presently preferred support system which provides multiple open cell foam cradles. The profile of each cradle is cut to resiliently mount between a vehicle dashboard and windshield.

Each cradle is cut to a general wedge shaped profile. A relatively flat upper surface mounts against the windshield and a lower surface includes a number of projections or reliefs which flex to fit adjacent recesses or projections in the dashboard. One or more notches or cavities are formed into the body of each cradle to support an anticipated storage item. Straps may be contained to the cradles to secure the cradle to the dashboard or a secured item to the cradle. A variety of hangers and fasteners may also be cast or fitted to the cradles to assure a positive mounting to the dashboard and to facilitate support of sundry storage items. Apertures may also be provided to facilitate airflow from the defroster vents.

Still other objects, advantages and distinctions of the invention will become more apparent from the following description with respect to the appended drawings. Similar components and assemblies are referred to in the various drawings with similar alphanumeric characters. The description should not be literally construed in limitation of the invention. Rather, the invention should be interpreted within the broad scope of the further appended claims.

DESCRIPTION OF THE PREFERRED EMBODIMENT

Figure 1:
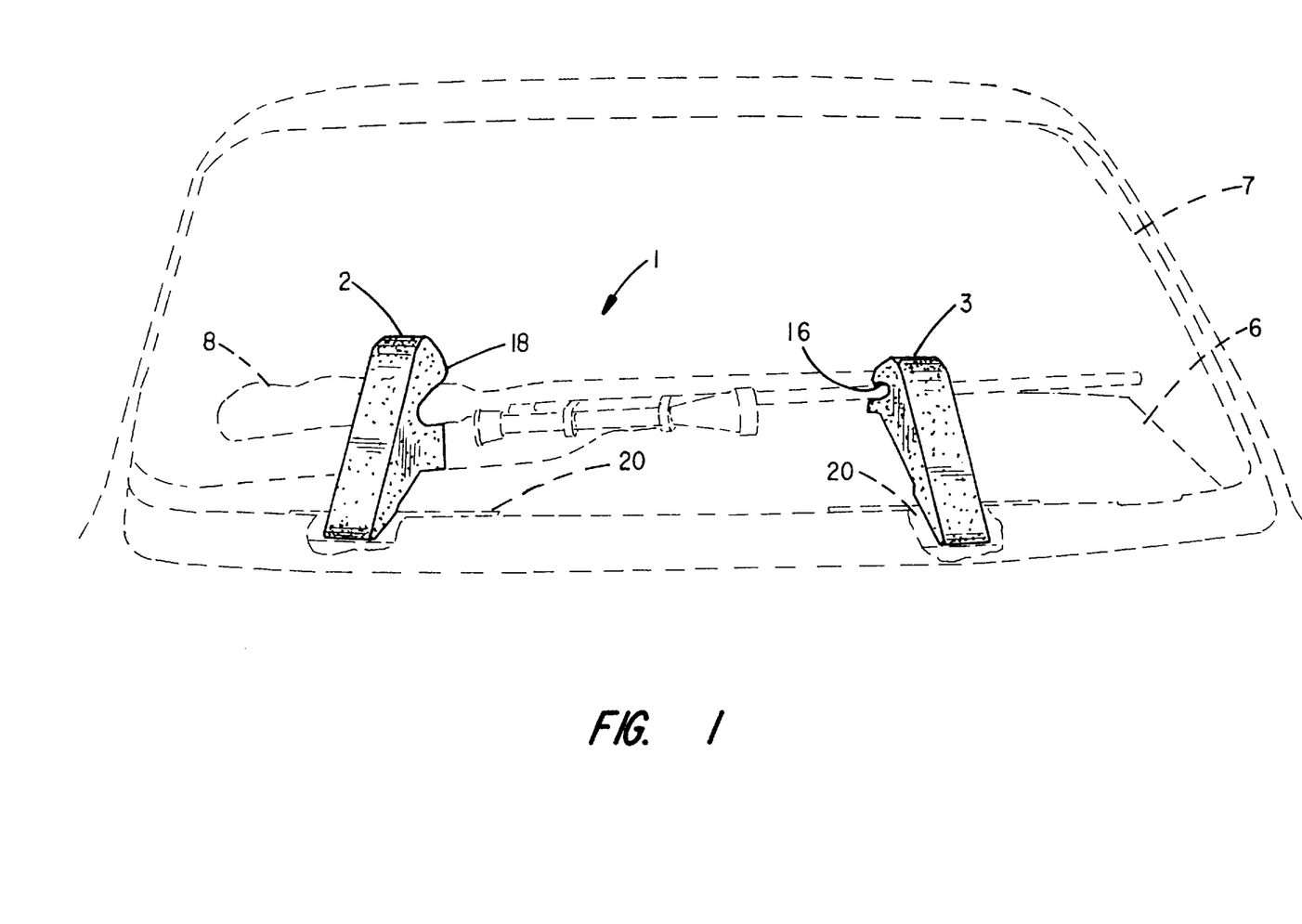
FIG. 1 is a perspective drawing, looking through a windshield, to a pair of foam cradles mounted to support a firearm (shown in dashed line) to a vehicle dashboard.
Figure 2:
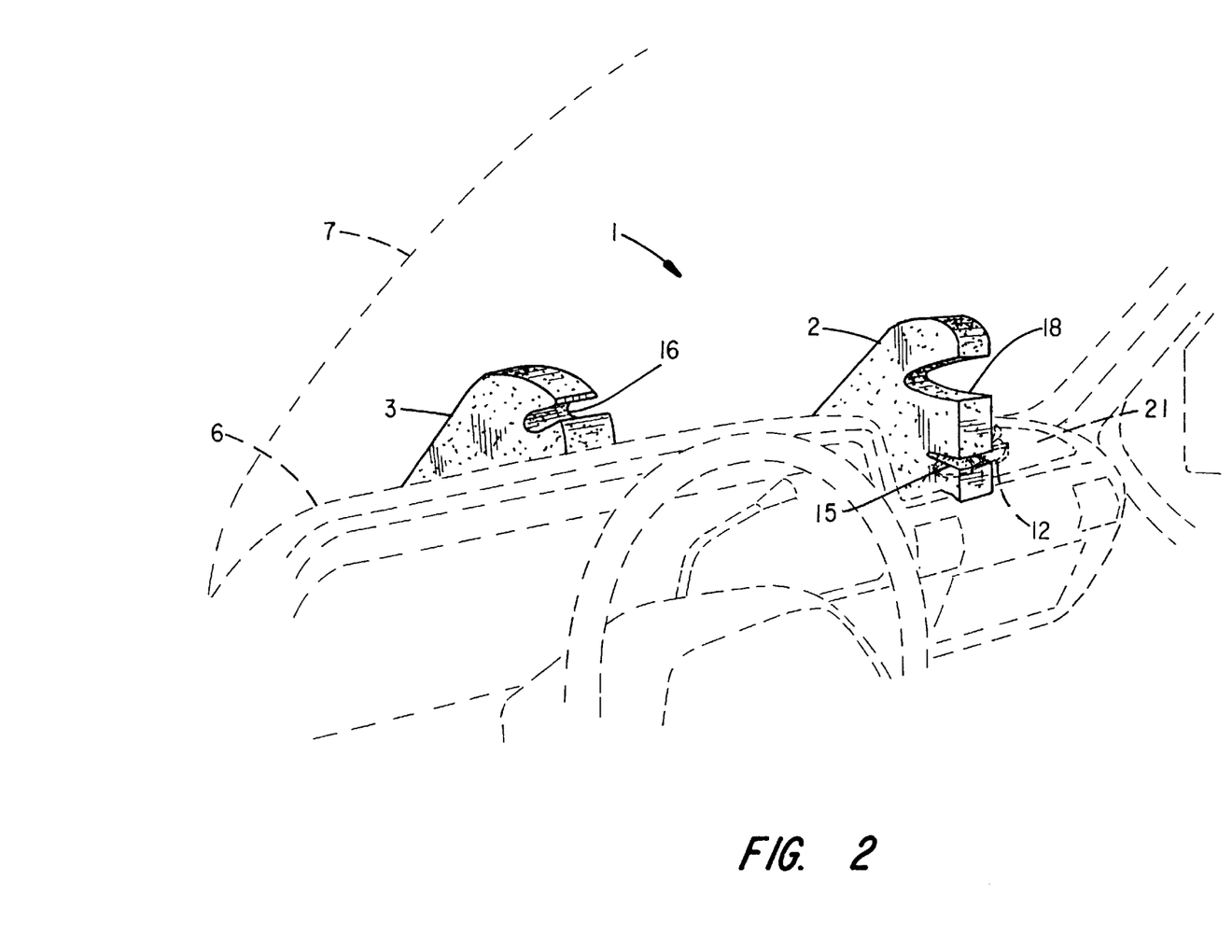
FIG. 2 is a perspective drawing to a pair of foam cradles fitted to a vehicle dashboard.
Figure 3:
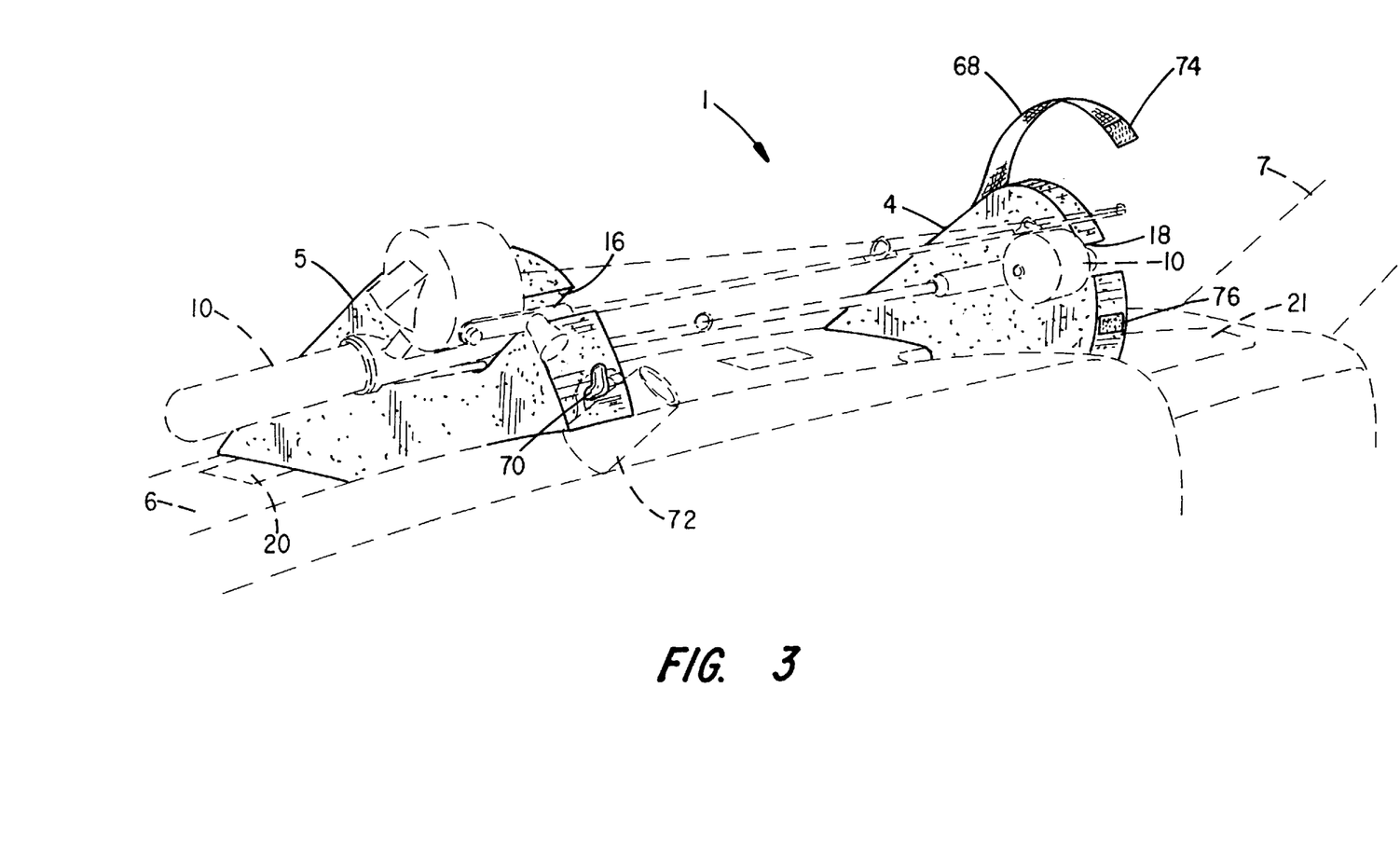
FIG. 3 is a perspective drawing to a pair of foam cradles mounted to support a pair of fishing rods (shown in dashed line) to a vehicle dashboard.
Figures 4, 5:
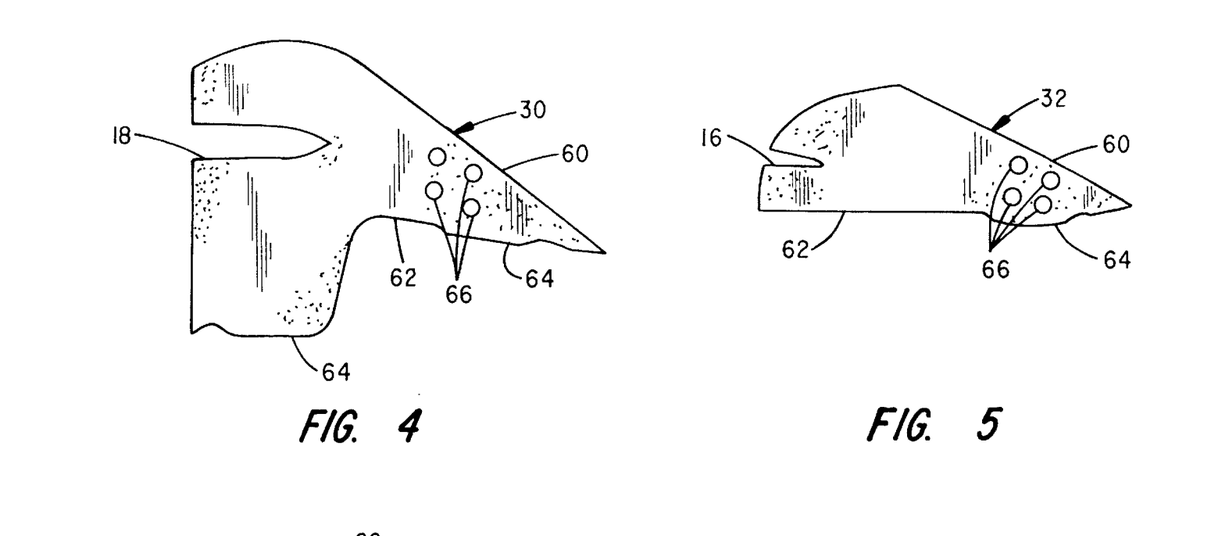
FIG. 4 is a plan view to the profile of a cradle adapted to support a firearm stock and fit the dashboard of a 1995 Ford Explorer.
FIG. 5 is a plan view to the profile of a cradle adapted to support a firearm barrel and fit the dashboard of a 1995 Ford Explorer.
Figure 6:
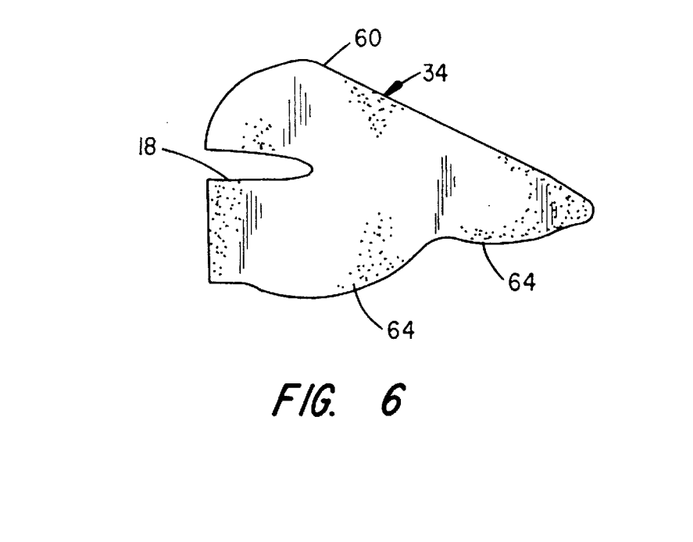
FIG. 6 is a plan view to the profile of a cradle adapted to support a firearm stock and fit the dashboard of a 1997 Ford pickup.
Figure 7:
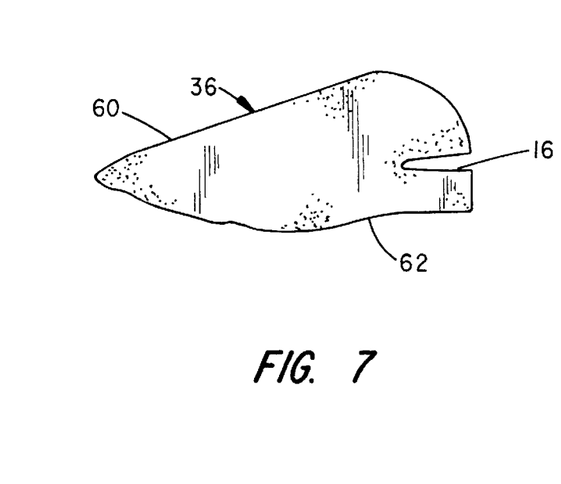
FIG. 7 is a plan view to the profile of a cradle adapted to support a firearm barrel and fit the dashboard of a 1997 Ford pickup.
Figure 8:
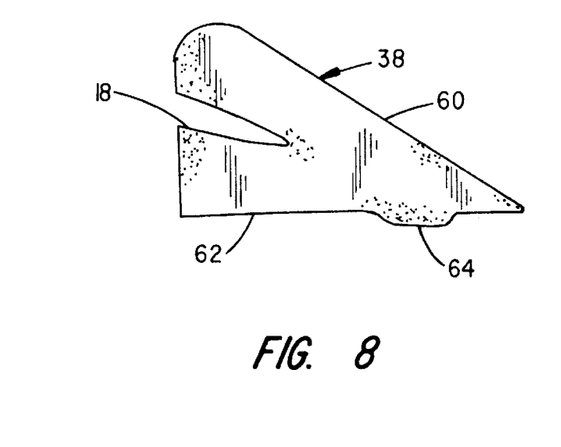
FIG. 8 is a plan view to the profile of a cradle adapted to support a firearm stock and fit the dashboard of a 1992 Chevrolet Astro van.
Figure 9:
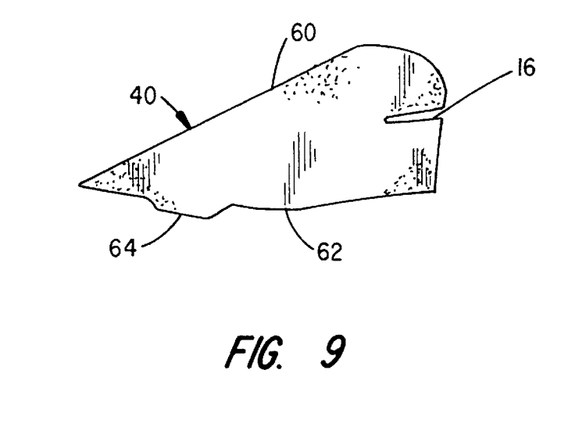
FIG. 9 is a plan view to the profile of a cradle adapted to support a firearm barrel and fit the dashboard of a 1992 Chevrolet Astro van.
Figure 10:
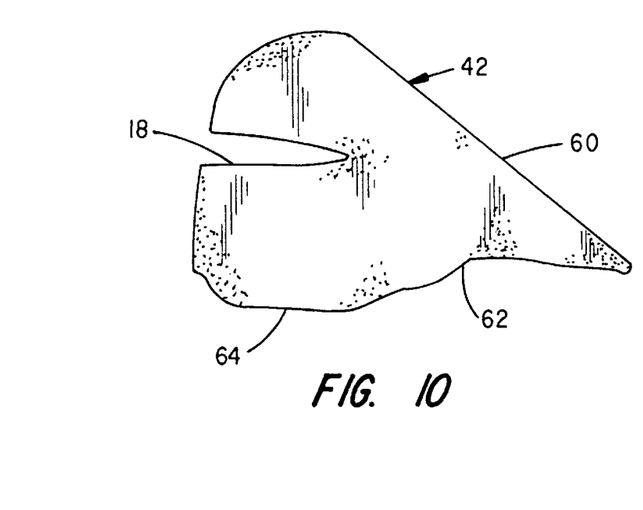
FIG. 10 is a plan view to the profile of a cradle adapted to support a firearm stock and fit the dashboard of a 1993 Dodge Caravan.
Figure 11:
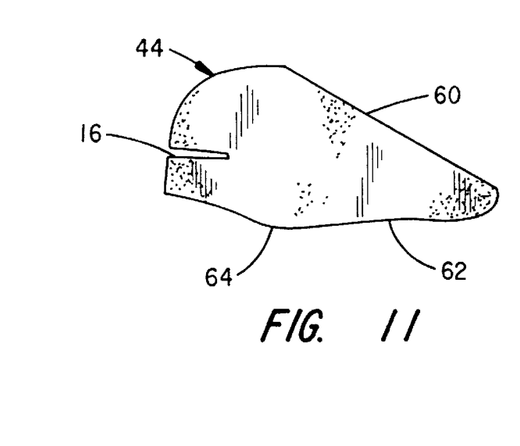
FIG. 11 is a plan view to the profile of a cradle adapted to support a firearm barrel and fit the dashboard of a 1993 Dodge Caravan.

Referring to FIGS. 1 through 3, views are shown to a resilient support system 1 having a number of resilient cradles 2–5 which mount between a vehicle dashboard 6 and windshield 7 for supporting firearms 8, fishing rods 10 or sundry other items, e.g. sunglasses 12. The number and mounting position of each cradle 2–5 can be varied as necessary to assure a secure fit and unobstructed retention of the gun 8, rod 10 or sunglasses 12.

Each cradle 2–5 is formed from a resilient material or includes surfaces, which preferably compress during cradle placement and re-expand to fit the particular profile exhibited between the vehicle dashboard 6 and windshield 7. Each cradle 2–5 includes one or more notches or cutouts or storage surfaces 15, 16 or 18 that are cut to support an intended item. For example, the notch 15 accepts the pair of sunglasses 12, the notch 16 is cut to accept the barrel of a rifle or shotgun and the notch 18 is cut to accept a gun stock. The notches 15, 16 and 18 can be cut to any desired contour or shape and multiple notches can be let into a cradle to receive any number of desired items.

The cradles 2–5 are presently cut from a 2 inch thick closed cell foam having a density selected in the range of 60 to 70 pounds with a compressive strength of 4–12 psi and which is sold under the brand names POLYPLANK and ETHAFOAM. This material is generally rigid, although can be compressed and will expand to its original form upon release. Such qualities are particularly desired to assure a snug fit to both the windshield and dashboard 6 and without potentially marring either from normal vehicle movement. Advantageously, the material expands with initial cradle mounting to assure a secure attachment to the vehicle and which expansion can be enhanced with the mounting of a stowed item to the cradle, which can induce additional expansion through the material to not only retain the stowed item but also enhance the gripping of the adjoining vehicle surfaces.

The material at the foregoing thickness is able to support a weight in the range of several pounds, without sagging. It also demonstrates a tolerance to heat and cold, without degradation and without affecting support capability. The material is tolerant of temperatures from −50 degrees Fahrenheit to +110 degrees Fahrenheit. The material is also tolerant of ultraviolet light, although may also be coated with a variety of coverings to accommodate desired properties and to support promotional artwork.

The material can be readily cut to a desired form using a variety of cutting techniques. For example, the cradles 2–5 can be die cut, laser cut or possibly cut with a heated ribbon or wire.

Depending upon the weight of the item to be supported, the thickness of each cradle 2–5 might be varied in a range of 1 to 2½ inches. The cradle width must, however, be such that the placement of multiple cradles on a dashboard 6 do not unduly obstruct air flow from defrost air vents 20 at the vehicle. Depending upon the type of material, the material thickness may also be varied.

Although one preferred type of material has been described, it is to be appreciated a variety foams (e.g. urethane, polyurethane, ethylene, polyethylene and others), which may be open or closed cell or exhibit various linkages; elastomers; nylons; or other resilient materials or composite assemblies might also be used to equal advantage.

Figure 12:
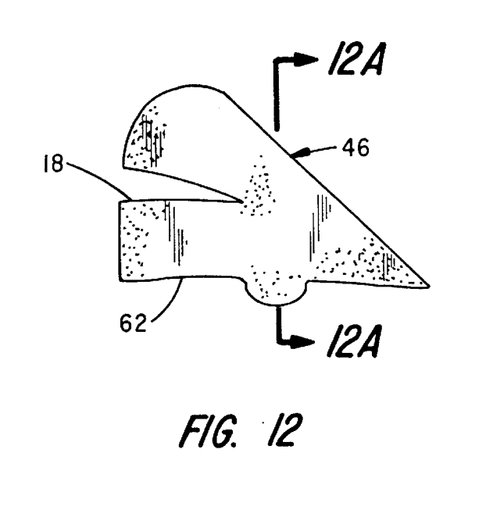
FIG. 12 is a plan view to the profile of a cradle adapted to support a firearm stock and fit the dashboard of a 1988 Chevrolet pickup.
Figures 12A, 13:
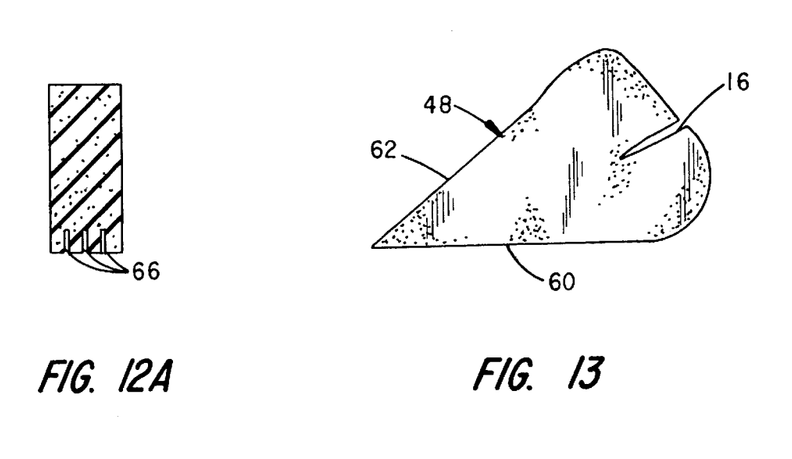
FIG. 12A is a cross section view taken along section lines 12A—12A of FIG. 2 to provided reliefs which mate with a grill work at a vehicle vent.
FIG. 13 is a plan view to the profile of a cradle adapted to support a firearm barrel and fit the dashboard of a 1988 Chevrolet pickup.
Figure 14:
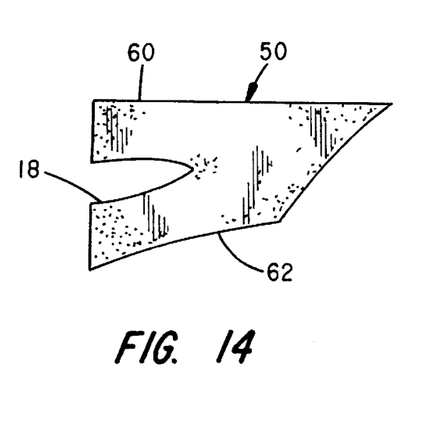
FIG. 14 is a plan view to the profile of a cradle adapted to support a firearm stock and fit the dashboard of a 1997 GMC pickup.
Figure 15:
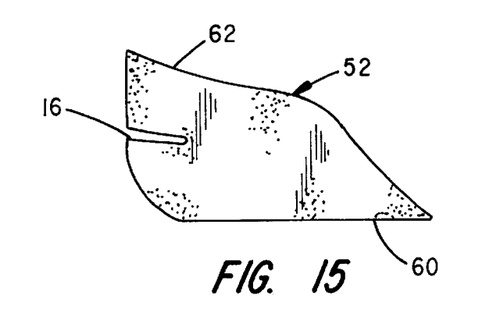
FIG. 15 is a plan view to the profile of a cradle adapted to support a firearm barrel and fit the dashboard of a 1997 GMC pickup.
Figures 16, 17:
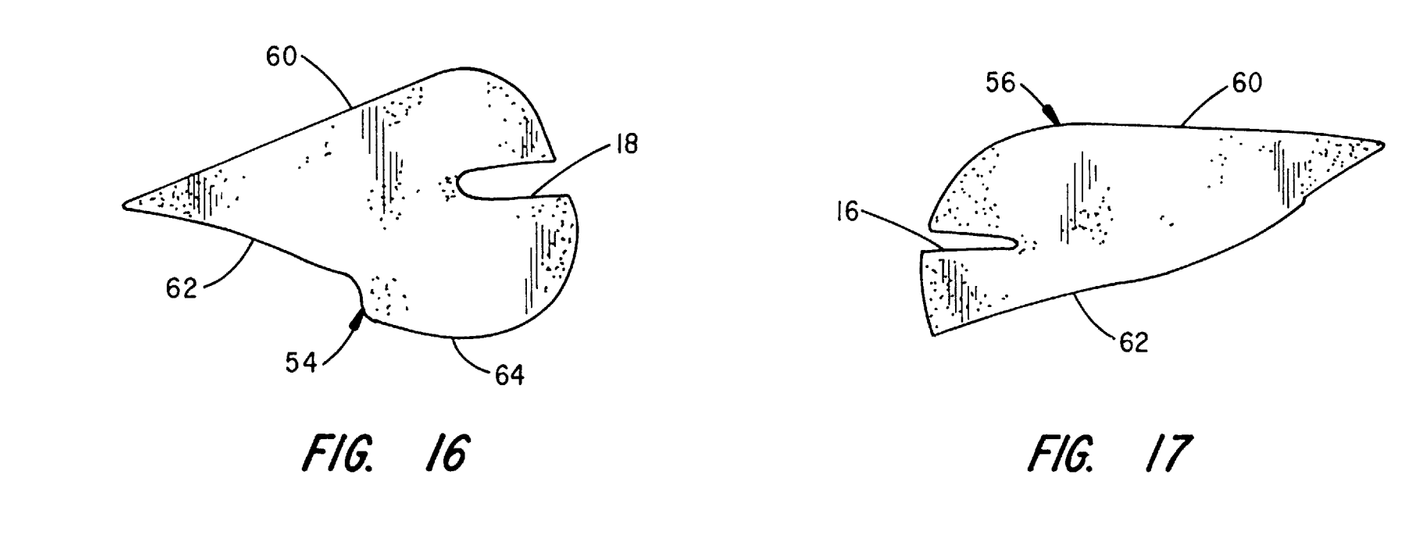
FIG. 16 is a plan view to the profile of a cradle adapted to support a firearm stock and fit the dashboard of a 1995 Dodge pickup.
FIG. 17 is a plan view to the profile of a cradle adapted to support a firearm barrel and fit the dashboard of a 1995 Dodge pickup.

With attention to FIGS. 4 through 17, a number of other cradles 30–56 are shown having various profiles to accommodate mountings to a number of different model years, body styles and types of pickup trucks, vans and recreational vehicles. Each cradle generally exhibits a flat surface 60 which abuts the windshield 7 and a contoured lower surface 62. The surfaces 60 and 62 extend from a common apex. The contour of the surfaces 62 is appropriately varied to complement the dashboard and may include one or more projections 64 to fit dashboard vents 20 or relieved surfaces 21, reference FIGS. 2 and 3, of the dashboard 6. Reliefs 66, reference FIG. 12A, may also be included at the surface 62 and/or projections 64 to fit any grills or other projections that extend from the dashboard 7.

Multiple notches, e.g. 15, 16 and 18, may also be displaced around the cradles, reference FIG. 2, and wherein representative notches are shown for separately supporting a number of fishing rods from a single cradle 2. Holes or apertures 66, reference FIGS. 4 and 5, may also be let into the cradles 30 and 32, for example, to receive a fishing rod handle or rod tip or to allow air from the vehicle defroster to pass through the cradle. Although the resilience of the cradles and shaping of any notches are normally selected and constructed to assure adequate gripping of supported items, straps can be fitted to the cradles to capture supported items to available notches 15, 16 and 18. For example a strap 68 and a hook 70, reference FIG. 3, may be fitted to the cradles 4 or 5 to better contain an intended storage item or support an item such as the handle of a coffee cup 72. Hook and loop or pile (e.g. VELCRO) fasteners 74 and 76 or other mating fasteners can be secured to the strap 68 and cradle 4 to ensure the retention of a strap 68 to the cradle 4.

Figure 18:
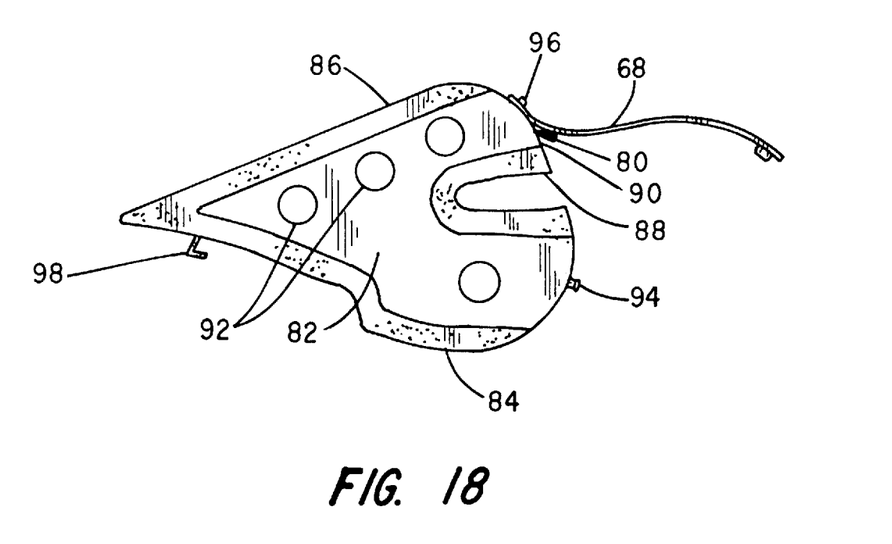
FIG. 18 is a plan view to the profile of a composite cradle having a molded plastic core covered with foam or elastomer covers.

In lieu of constructing the cradles from a single material, a composition cradle 80, reference FIG. 18, might be constructed with a rigid core 82 and to a number of surfaces of which resilient covers 84, 86 and 88 are applied. The covers 84–88 can be formed from the foregoing foam or a variety of elastomer materials to compress and expand to fit the vehicle and any supported accessory item. A plastic or nylon core 82 can include a notch 90, apertures 92 and a snap fastener 94 that mate to a complementary strap 68 which is secured with a rivet 96 to the core 82. One or more flanges 98 may also extend from the core 82 and project through the covers 84–88 to grip openings in the dashboard vent 20 and prevent slippage of the cradle 80 in the event of sudden vehicle stops. The availability of a flange 98 can thus enhance the attachment of a cradle to the dashboard.

The foam covers 84–88 can be adhesively bonded to appropriate surfaces of the core 82 or might possibly be molded as part of the cradle 80 in an insert molding operation to the core 82. Interlocking projections and reliefs might also be provided at the core 82 and covers 84–88 to facilitate attachment. In short, a composite cradle construction can provide additional, tailored features at each cradle, albeit at greater cost.

While the invention has been described with respect to a preferred construction, still other constructions may be suggested to those skilled in the art. The foregoing description should be construed to include all those embodiments within the spirit and scope of the following claims.

What is claimed is:

1. A dashboard storage assembly for a vehicle having a dashboard and a windshield that extends at an acute angle above the dashboard, comprising first and second cradles longitudinally displaced from one another in the space between the dashboard and windshield, wherein each of the first and second cradles includes first and second resilient surfaces that extend at an acute angle relative to one another and wherein each of the first and second cradles includes a notched storage space, whereby the first and second resilient surfaces compress and re-expand to grip the dashboard and windshield and contain an item stowed at the notched storage spaces.

2. A dashboard storage assembly as set forth in claim 1 wherein the notched storage space of each of said first and second cradles is shaped to support a firearm.

3. A dashboard storage assembly as set forth in claim 2 wherein one of said first and second cradles includes a strap fitted to overly the notched storage space.

4. A dashboard storage assembly as set forth in claim 2 wherein each of said first and second cradles is constructed of a foam and wherein the first and second resilient surfaces extend from an apex at an acute angle relative to one another and exhibit a profile complementary to the space between the dashboard and windshield.

5. A dashboard storage assembly as set forth in claim 4 wherein one of said first and second cradles includes a flange that extends and is adapted to interlock with a portion of the dashboard.

6. A dashboard storage assembly as set forth in claim 4 wherein one of said first and second cradles includes a projecting hook.

7. A dashboard storage assembly as set forth in claim 1 wherein one of said first and second cradles comprises a core piece having a plurality of peripheral edges covered with a plurality of resilient cover pieces, wherein a plurality of the cover pieces define the first and second resilient surfaces and wherein said core piece is constructed of a material having a density substantially greater than that of the cover pieces.

8. A dashboard storage assembly as set forth in claim 7 wherein the core piece includes a flange that extends and is adapted to to interlock with a portion of the dashboard.

9. A dashboard storage assembly as set forth in claim 1 wherein one of said first and second cradles includes a raised surface that projects and is configured to mount to a recessed surface of the dashboard.

10. A dashboard storage assembly as set forth in claim 1 wherein one of said first and second cradles includes a plurality of notched storage spaces.

11. A dashboard storage cradle for a vehicle comprising a body having first and second peripheral surfaces that extend at an acute angle relative to one another, wherein an edge portion of at least one of the first and second peripheral surfaces is defined by a resilient material that compresses and re-expands and wherein the body includes a notched storage space, whereby the first and second peripheral surfaces are configured to be wedged in a space between a vehicle dashboard and a windshield that acutely extends above the dashboard to grip the dashboard and windshield and secure the cradle to the vehicle and contain an item stowed at the notched storage space.

12. A dashboard storage cradle as set forth in claim 11 wherein said body is constructed of a resilient foam such that each of said first and second peripheral surfaces compress and re-expand to secure the cradle to the vehicle.

13. A dashboard storage cradle as set forth in claim 12 wherein said first and second peripheral surfaces extend from a common apex and said body includes a raised surface that projects and is configured to mount to a recessed surface of the dashboard.

14. A dashboard storage cradle as set forth in claim 12 wherein the body includes a flange that extends and is adapted to interlock with a portion of the dashboard.

15. A dashboard storage cradle for a vehicle, comprising a body having first and second peripheral surfaces that include edge portions constructed of a resilient material that compress and re-expand, wherein the first and second peripheral surfaces extend from an apex at an acute angle relative to one another, and wherein the body includes a notched storage space, whereby the first and second peripheral surfaces are configured to be wedged in a space between a vehicle dashboard and a windshield that acutely extends above the dashboard to grip the dashboard and windshield and secure the cradle to the vehicle and contain an item stowed at the notched storage space.

16. A dashboard storage cradle as set forth in claim 15 wherein a raised surface projects from one of said first and second peripheral surfaces and is configured to mount to a recessed surface at the dashboard.

17. A dashboard storage cradle as set forth in claim 15 wherein the body includes a strap fitted to overly the notched storage space.

18. A dashboard storage cradle as set forth in claim 15 wherein the body includes a plurality of notched storage spaces.

19. A dashboard storage cradle as set forth in claim 15 wherein the body includes a projecting hook.

20. A dashboard storage cradle as set forth in claim 15 wherein the body includes a flange that extends and is adapted to interlock with a portion of the vehicle dashboard.

* * * * *